United States Patent [19]

Karpinia

[11] 4,417,565
[45] Nov. 29, 1983

[54] FAST AND EASY CHARCOAL STARTER

[76] Inventor: Walter Karpinia, 600 W. Lakeridge Dr., Eagle River, Ak. 99577

[21] Appl. No.: 376,307

[22] Filed: May 10, 1982

[51] Int. Cl.³ .............................................. B26D 1/32
[52] U.S. Cl. ................................. 126/25 B; D23/90.1
[58] Field of Search ..................... 126/25 B; D23/90.1

[56] References Cited

U.S. PATENT DOCUMENTS 3,765,397 10/1973 Henderson ..................... 126/25 B Primary Examiner—Carroll B. Dority, Jr.
Attorney, Agent, or Firm—Michael J. Tavella

[57] ABSTRACT

An improved charcoal starting device is disclosed wherein charcoal is ignited and brought to cooking temperature outside of a conventional stove or grill. Once the charcoal is thus started it is then transferred from the starter to the stove for normal. The device requires only a small amount of paper or kindling and needs no chemical or electrical means to sustain combustion. The device is comprised of a sheet metal housing being tapered on both ends so that a restricted passage is formed in the middle thereby forming a venturi. A second smaller venturi pipe is installed in the upper tapered section to further increase the airflow through the unit and to better focus the combustion air. Holes are provided in the lower unit so that a large volume of air can pass through the device. A grate, placed above the inner venturi pipe is used to support the charcoal. A novel heat shield and handle arrangement is also provided so that the device can be moved and the charcoal transferred to the stove or grill.

4 Claims, 4 Drawing Figures

FAST AND EASY CHARCOAL STARTER

This invention relates to portable charcoal starters and more particularly to charcoal starters having precombustion chambers and employing multiple venturies to accelerate the flow of air over the charcoal thereby producing faster ignition of the charcoal.

BACKGROUND OF THE INVENTION

Cooking with charcoal has become a very popular pastime in the United States. Accordingly, there are many types of charcoal stoves and grills providing a wise range of cooking surfaces, styles and portability.

When fully ignited, charcoal burns at an even temperature for sustained periods. Most stoves allow for only enough air to produce this even burning of the charcoal which is best for even cooking of food. Thus, many stoves sold today require some sort of starting agent to both ignite and sustain combustion. Typically these starting agents include various forms of petrolieum distillates, electric coils or bottled gasses.

All of the agents described above have problems in their use. Petrolieum products for instance often create fire or explosion hazzards. Electric coils require a source of power and are generally slow. Bottled gasses also have fire and explosion hazzards as well.

As stated above, the major problem with igniting charcoal is in the design of the stove and not with the charcoal. It is the intent of this invention to provide a device for starting charcoal that uses a small amount of kindling or paper to ignite the charcoal quickly, without chemical or other means.

BRIEF DESCRIPTION OF THE INVENTION

The Fast and Easy Charcoal Starter is a device comprising two tapered bell sections having opposite tapers joined at their respective narrow ends thus forming a venturi. The bottom tapered bell end has at least one combustion air entry hole in the base of the bell end, and is used as a precombustion chamber wherein paper or kindling is placed and ignited. The top tapered bell end has a grate installed therein to support the charcoal. The top tapered bell end has an inner venturi pipe installed therein as well. The inner venturi pipe is placed immediately below the grate and is used to further focus and concentrate the flow of air through the charcoal. The inner venturi pipe also provides additional accecer-ation of the air through the starter thereby providing the draught of the starter.

A heat shield is placed concentrically around the top bell housing and is fastend in place by means of tabs placed symmetrically around the starter. The placement of the shield forms an air gap between the shield and the top bell housing which allows passage of cooling air therebetween, thus insulating the heat shield from the starter.

A handle is attached to the unit for transferring the fully ignited charcoal to the stove or grill. The handle is bolted to the bottom bell housing and either bolted or clipped to the heat shield. This method would allow the handle to be removed for compact packaging or storage.

To use the starter, a small quanitity of kindling or paper is placed in the bottom bell housing. A quanitity of charcoal is then placed on the grate. Once lit, the paper quickly starts the charcoal burning. The heat from the ignited charcoal draws large volumes of air through the starter thus acccecerating the combustion of the charcoal quickly bringing it to a useable temperature.

Although the starter could be used for cooking, the high rate of combustion makes cooking impractical. Thus, this device should be used with a grill or stove in combination.

DETAILED DESCRIPTION OF THE INVENTION

Figure 2:
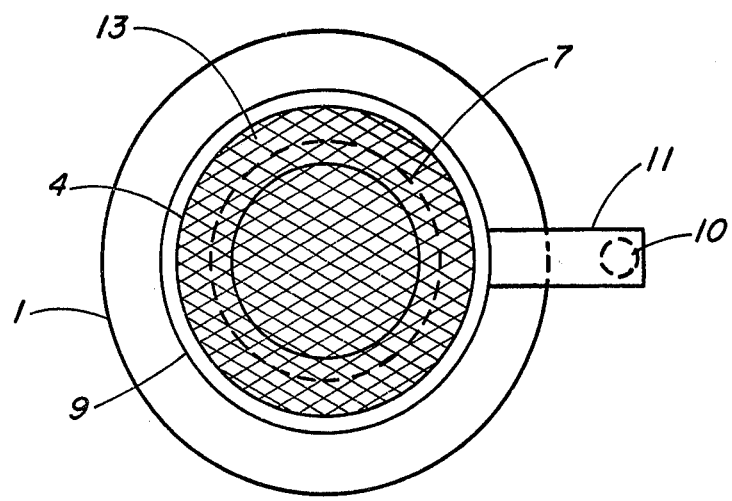
FIG. 2 is a plan view of the preferred embodiment.
Figure 1:
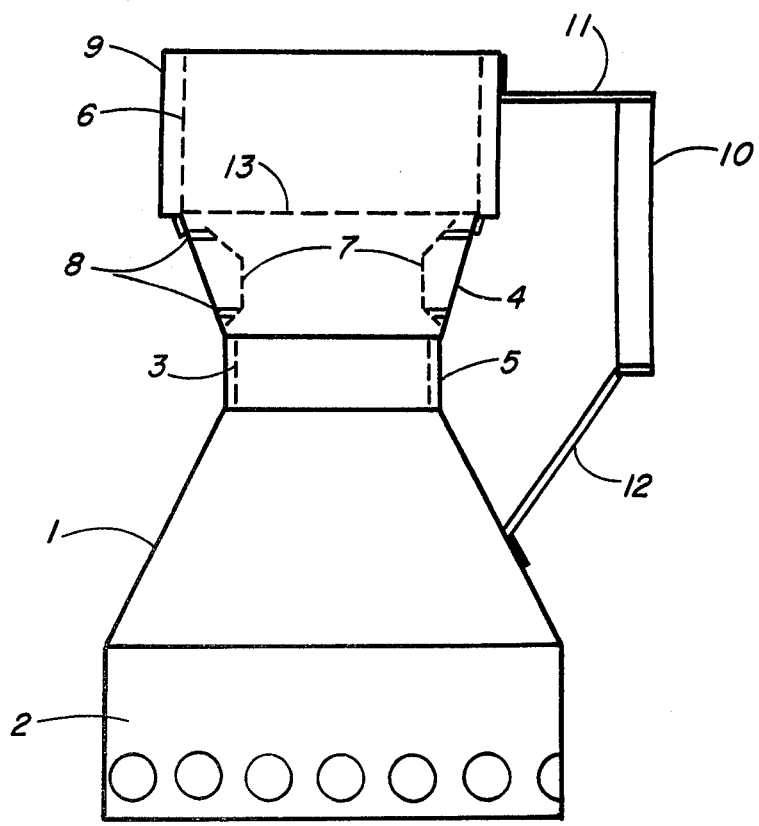
FIG. 1 is an elevation view of the preferred embodiment.

Referring now to FIG. 1, there is shown a charcoal starter having a bottom tapered bell end 1 having two verticle skirts 2 and 3 attached to opposite ends of the tapered bell end 1. The first verticle skirt 2 is used as a base for the device and is provided with at least one hole for combustion air. In the preferred embodiment, the bottom verticle skirt 2 would have a plurality of holes placed symmetrically around the circumfrence of the skirt 2. The second verticle skirt 3 is placed at the opposite end of the bottom tapered bell end 1 and is used as an interlocking collar with the second or top tapered bell housing 4.

The top tapered bell housing 4 is of opposite configuration to the bottom tapered bell housing 1. The top tapered bell housing 4 is also provided with two verticle skirts 5 and 6. The bottom verticle skirt 5 is used as an interlocking collar with verticle skirt 3 on the bottom tapered bell housing 1. Thus, collar 3 will lock into collar 5 making a single joined unit. The combined skirts 3 and 5 can then be rigidly fastened together by means common to sheet metal work such as rivits, spot welding or screws. Both tapered bell housings as well as other internal components are fashioned from sheet metal by process standard to the industry.

The second verticle skirt 6 is attached to the top of the second tapered bell housing 4. This skirt is used as a wind screen for the charcoal as well as a means for confining the charcoal. The top verticle skirt 6 also acts as the top of the chimney which helps to produce a strong updraft through the device.

Figure 4:
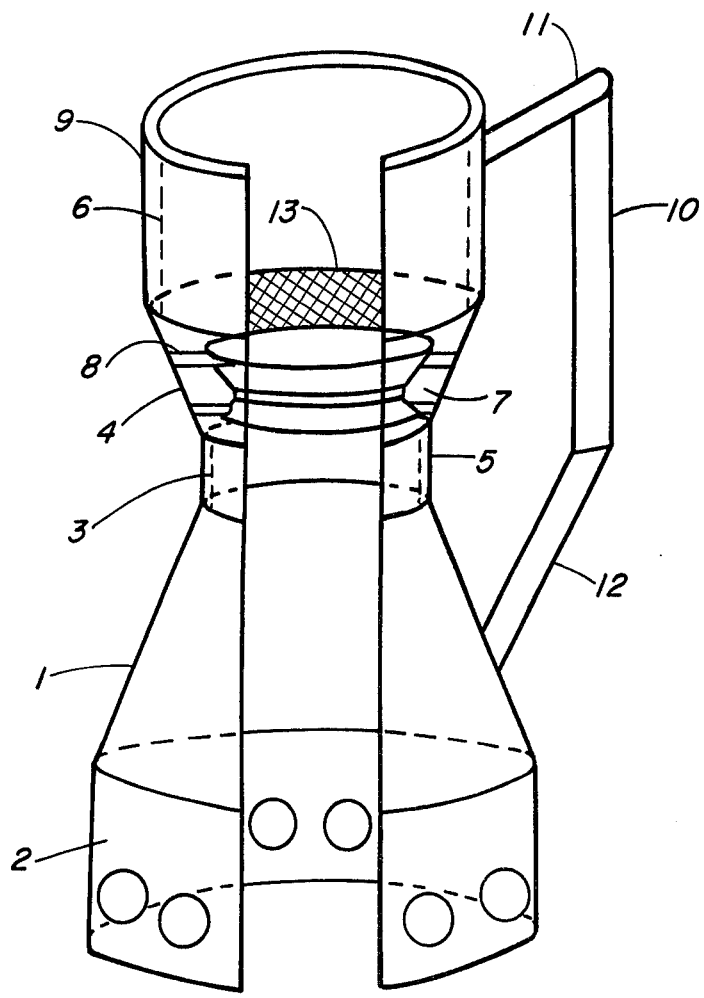
FIG. 4 is a cutaway perspective view of the preferred embodiment.

Referring now to FIG. 4, a venturi pipe 7 is installed within the tapered portion of the top bell housing 4. The inner venturi pipe 7 is used to further concentrate the flow of air delivered to the charcoal, it is also used to further accelerate the air flow thereby increasing the updraft of the device. The inner venturi pipe 7 is held in the place by holding means 8. In the preferred embodiment, the holding means 8 comprise stainless steel rods placed symmetrically around the circumference of the inner venturi pipe 7. These rods 8 can be welded in place or fastened in other manners known in the art. Other types of rods can be substituted for the rods as described above and they can be installed in other manners also known in the art.

A grate 13 is also installed in the top tapered bell housing 4. The grate is placed immediately above the inner venturi pipe 7. The grate 13 can by made removable or fixed in place within the device. The grate 13 is used to support the charcoal and is made of expanded metal or similar material.

A circular heat shield 9 is placed concentrically around the top verticle skirt 6. The heat shield 9 is fastened to the device by means of tabs placed symmetrically around the shield 9 on both the bottom and the top of the shield 9, (the tabs are not shown for clarity). The tabs are then fastened to the top tapered bell housing 4 and the top verticle skirt 6 by rivits or other means known in the art.

The heat shield 9 is placed so that an air gap is formed between the heat shield 9 and the top verticle skirt 6. This air gap allows cooling air to pass between the heat shield 9 and the top verticle skirt 6 thus insulating the shield 9 from the heat of the charcoal.

A handle 10 is provided to transfer the fully ignited charcoal to the stove or cooker. The heat shield 9 protects the user from the heat during the transfer as well as keeping the handle 10 at a safe handling temperature. The handle 10 is fastend to the shield 9 and the bottom tapered bell housing 1 by two straps 11 and 12. The straps 11 and 12 are fastend to the handle 10 by wood screws or other obvious means. The strap 11 is fastend to the heat shield 9 by means of machine bolts and nuts or a clip mechanism which allows the strap 11 to be attached to the heat shield 9 without screws or other means. The strap 12 is fastend to the bottom tapered bell housing 1 by means of machine screws. It is intended that the handle 10 and straps 11 and 12 be removable from the device as a unit allowing the device more compact packaging. The design of the heat shield 9 also allows for convient packaging as well.

Figure 3:
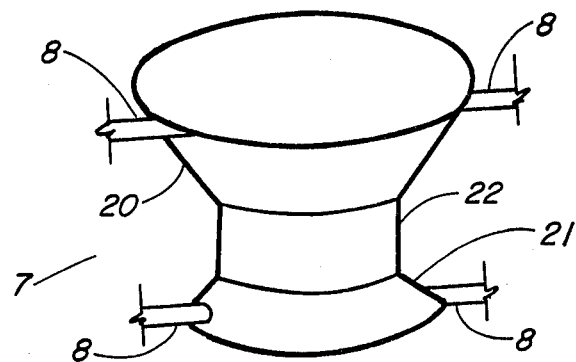
FIG. 3 is an exploded view of the inner venturi pipe.

Referring now to FIG. 3, the inner venturi pipe 7 has a bottom flared section 21 and a top flared section 20 which are then connected to opposite ends of pipe section 22. The inner venturi pipe 7 is designed not to touch the inside wall of the top tapered bell housing 4, thereby allowing a small amount of air to pass through the space between the pipe 7 and the wall which provides air for combustion along the edges of the top verticle skirt 6 again increasing the efficiency of combustion. Since the inner venturi pipe 7 does not touch the wall of the top tapered bell housing 4, flare end 21 will be smaller in diameter then flared end 20.

The combination of the top and bottom bell housings forms a first venturi. Since the volume of the bottom bell housing 1 is larger than the volume of the top tapered bell housing 4 the result is a net increase in the velocity of the air passing through the unit. As Heat is applied to the charcoal a strong updraft is created within the unit. The addition of the inner venturi pipe 7 futher restricts the flow of air accelerating the air flow even more. The opposite taper of the venturi pipe 7 allows the air to spread over the surface of the charcoal prommoting complete combustion of the charcoal. Further the additional air flowing between the venturi pipe 7 and the inner wall of the top tapered bell housing 4 allows combustion to take place on the edges of the charcoal as well. As the charcoal burns, a larger volume of air is drawn through the device increasing the rate of combustion in a chain reaction.

The starter is used by placing a small quantity of paper or kindling in the bottom tapered bell housing. A quantity of charcoal is then placed on the grate. The Paper is lit through one of the ventilation holes and the charcoal is ignited. With only a small amount of paper, the charcoal will be fully lit and ready for cooking in five to seven minutes. The starter is then lifted by the handle and the charcoal is transfered to the stove.

I claim:

1. A Fast and Easy Charcoal Starter comprising: a first tapered bell housing having a bottom and a top; wherein said top is smaller in diameter than said bottom; said bottom of the first tapered bell housing having a first verticle skirt fixedly attached to the first tapered bell housing, said first verticle skirt having at least one combustion air hole provided therein; the top of said first bell housing having a second verticle skirt being of the same diameter as the first tapered bell housing being fixedly attached thereon; A second tapered bell housing being of opposite configuration to the first tapered bell housing, having a top and a bottom, the top of the second tapered bell housing being larger in diameter than the bottom of the second tapered bell housing; said second tapered bell housing also having top and bottom verticle skirts fixedly attached to said second tapered bell housing similar in nature to the verticle skirts on the first tapered bell housing, said bottom verticle skirt of the second tapered bell housing being slidably connected to the top verticle skirt of the first tapered bell housing thereby forming a contiguous unit; means for fixedly securing the top verticle skirt of the first tapered bell housing to the bottom verticle skirt of the second tapered bell housing; a venturi pipe fixedly attached inside the second tapered bell housing, said venturi pipe having a top tapered end and a bottom tapered end generally comforming to the taper of the second tapered bell housing and being smaller in diameter than the second tapered bell housing thereby allowing the passage of air therebetween, the top and bottom tapered ends of said venturi pipe being fixedly connected by a restricted pipe whereby the entire assenbly forms a venturi, the diameter of the restricted pipe being smaller than the diameter of the connected verticle skirts of the first and second tapered bell housings; means to fixedly attach said venturi pipe to said second tapered bell housing whereby said venturi pipe is suspended therein; a grate placed in the second tapered bell housing immediately above the venturi pipe for the support of the charcoal.

2. The Fast and Easy Charcoal starter as described in claim 1 wherein means to support the venturi pipe comprise stainless steel high temperature rods fixedly attached to the venturi pipe and the second tapered bell housing.

3. The Fast and Easy Charcoal Starter as described in claim 1 further comprising: a heat shield, said heat shield being a cyclindrical member being larger in diameter than the top verticle skirt of the second tapered bell housing, said heat shield being placed concentrically around the top verticle skirt of the second tapered bell housing thereby forming an air gap therebetween; a plurality of tabs attached to the bottom of said heat shield fixedly attached as well to the tapered portion of the second tapered bell housing, said tabs providing connection means and support means for said heat shield; a second pluralarity of tabs being fixedly attached to the top of said heat shield and to the top of the top verticle skirt of the second tapered bell housing further providing lateral support; means for fixedly connecting said tabs to said heat shield and the top verticle skirt of the second tapered bell housing; a handle, fixedly attached to said heat shield by means of a connecting strap and also fixedly attached to the tapered portion of the first tapered bell housing by means of a second connecting strap; means for connecting said handle to said connecting straps; means for connecting said connecting straps to said heat shield and said first tapered bell housing.

4. The Fast and Easy Charcoal starter as described in claim 3 wherein means for attaching the handle straps comprise two machine bolts and nuts.

* * * * *